(12) United States Patent
Hanasaki et al.

(10) Patent No.: US 9,147,882 B2
(45) Date of Patent: Sep. 29, 2015

(54) BINDER FOR LITHIUM ION SECONDARY BATTERY ELECTRODE, SLURRY OBTAINED USING THE BINDER FOR ELECTRODE, ELECTRODE OBTAINED USING THE SLURRY, AND LITHIUM ION SECONDARY BATTERY USING THE ELECTRODE

(75) Inventors: Mitsuru Hanasaki, Tatsuno (JP); Kazunari Fukase, Tatsuno (JP); Jiro Uchida, Tatsuno (JP); Yasutaka Kono, Sagamihara (JP); Yuka Chikugo, Sagamihara (JP); Kou Ishiguchi, Sagamihara (JP)

(73) Assignees: SHOWA DENKO K. K., Tokyo (JP); NEC ENERGY DEVICES, LTD., Kanagawa (JP)

( * ) Notice: Subject to any disclaimer, the term of this patent is extended or adjusted under 35 U.S.C. 154(b) by 111 days.

(21) Appl. No.: 13/698,455

(22) PCT Filed: Apr. 15, 2011

(86) PCT No.: PCT/JP2011/059406
§ 371 (c)(1),
(2), (4) Date: Jan. 29, 2013

(87) PCT Pub. No.: WO2011/145419
PCT Pub. Date: Nov. 24, 2011

(65) Prior Publication Data
US 2013/0119318 A1 May 16, 2013

(30) Foreign Application Priority Data

May 19, 2010 (JP) ................................. 2010-115807

(51) Int. Cl.
*H01B 1/00* (2006.01)
*H01M 4/88* (2006.01)
(Continued)

(52) U.S. Cl.
CPC .............. *H01M 4/622* (2013.01); *C08F 2/22* (2013.01); *C08F 212/08* (2013.01); *C08F 220/06* (2013.01);
(Continued)

(58) Field of Classification Search
None
See application file for complete search history.

(56) References Cited

U.S. PATENT DOCUMENTS

| 2002/0068783 A1* | 6/2002 | Maeda et al. ................. 524/474 |
| 2006/0251966 A1* | 11/2006 | Yamakawa et al. ........... 429/217 |
| 2012/0095131 A1* | 4/2012 | Kinoshita et al. ............. 523/410 |

FOREIGN PATENT DOCUMENTS

| CN | 102439769 | 5/2012 |
| JP | 5-74461 A | 3/1993 |

(Continued)

OTHER PUBLICATIONS

Search report from International Application No. PCT/JP2011/059406, mail date is Jul. 26, 2011.
(Continued)

*Primary Examiner* — Harold Pyon
*Assistant Examiner* — Jaison Thomas
(74) *Attorney, Agent, or Firm* — Greenblum & Bernstein, P.L.C.

(57) ABSTRACT

An object of the present invention is to provide: a binder for a lithium ion secondary battery electrode, which is water-dispersible type and has favorable adhesion between active materials and between the active material and current collectors, along with charge-discharge high-temperature cycle characteristics; a slurry using the binder; an electrode using the slurry; and a lithium ion secondary battery using the electrode. The present invention relates to a binder composition for a lithium ion secondary battery electrode, which is obtained by emulsion polymerization of an ethylenically unsaturated monomer in the presence of a surfactant, the ethylenically unsaturated monomer containing, as essential constituents, 15 to 70 mass % of styrene with respect to the total mass of ethylenically unsaturated monomers, an ethylenically unsaturated carboxylic acid ester, an ethylenically unsaturated carboxylic acid and an internal cross-linking agent.

8 Claims, 2 Drawing Sheets

(51) Int. Cl.
  *C08F 20/10* (2006.01)
  *H01M 4/62* (2006.01)
  *C08F 2/22* (2006.01)
  *C08F 212/08* (2006.01)
  *H01M 4/04* (2006.01)
  *H01M 4/133* (2010.01)
  *H01M 4/139* (2010.01)
  *H01M 10/0525* (2010.01)
  *C08F 220/06* (2006.01)
  *C08F 220/18* (2006.01)

(52) U.S. Cl.
  CPC ...... *C08F 2220/1833* (2013.01); *H01M 4/0404* (2013.01); *H01M 4/133* (2013.01); *H01M 4/139* (2013.01); *H01M 10/0525* (2013.01); *Y02E 60/122* (2013.01)

(56) References Cited

FOREIGN PATENT DOCUMENTS

| | | |
|---|---|---|
| JP | 6-150906 A | 5/1994 |
| JP | 8-250123 A | 9/1996 |
| JP | 10-279608 | 10/1998 |
| JP | 11-288720 | 10/1999 |
| JP | 2000-195521 | 7/2000 |
| JP | 2000-299109 | 10/2000 |
| JP | 2002-231251 | 8/2002 |
| JP | 2006-260782 | 9/2006 |
| JP | 2006-269386 | 10/2006 |
| WO | 98/14519 | 4/1998 |
| WO | 2007/032374 | 3/2007 |
| WO | WO 2010/114119 * | 10/2010 ............ H01M 4/621 |
| WO | WO 2010114119 A1 * | 10/2010 ............ H01M 4/62 |

OTHER PUBLICATIONS

International Preliminary Report on Patentability and Written Opinion of the Searching Authority for International Application No. PCT/JP2011/059406, mail date is Dec. 10, 2012.

Office Action for CN Patent Application No. 201180024863.7, which is dated Jul. 3, 2014; along with an English Translation thereof.

Notification of Reasons for Refusal for Japanese Patent Application No. JP2010-115807, which was dispatched on Apr. 15, 2014; along with an English translation thereof.

* cited by examiner

BINDER FOR LITHIUM ION SECONDARY BATTERY ELECTRODE, SLURRY OBTAINED USING THE BINDER FOR ELECTRODE, ELECTRODE OBTAINED USING THE SLURRY, AND LITHIUM ION SECONDARY BATTERY USING THE ELECTRODE

TECHNICAL FIELD

The present invention relates to a binder for a lithium ion secondary battery electrode, slurry for a lithium ion secondary battery electrode, which includes the binder and an active material, a lithium ion secondary battery electrode using the slurry, and a lithium ion secondary battery using the electrode.

BACKGROUND ART

In recent years, lithium ion secondary batteries have attracted attention in terms of reduction in size and weight for laptop computers, cellular phones, electric power tools, and electronic and communication devices, and recently, from the standpoint of application to environmentally-friendly vehicles, there has been strong demand for lithium ion secondary batteries for electric cars and hybrid cars, and in particular, for lithium ion secondary batteries with high voltage, high capacity, and high energy density.

A lithium ion secondary battery is composed of a positive electrode including a metal oxide such as a lithium cobalt oxide as an active material, a negative electrode including a carbon material such as graphite as an active material, and an electrolytic solution solvent mainly including carbonates, and is a secondary battery which is charged and discharged by the movement of lithium ions between the positive electrode and the negative electrode. More specifically, a lithium ion second battery is obtained by forming a positive electrode layer on the surface of a positive electrode current collector such as aluminum foil from slurry composed of the metal oxide and a binder with the positive electrode, and by forming a negative electrode layer on the surface of a negative electrode current collector such as copper foil from slurry composed of graphite and a binder with the negative electrode. Therefore, each binder has a role in adhesion between the active materials each other and between the active materials and the current collectors to prevent the active materials from peeling from the current collectors.

Conventionally, polyvinylidene fluoride (PVDF) with an organic solvent, N-methylolpyrrolidone (NMP) as a solvent has been used as a binder for adhesion of an active material to a current collector because of the high swelling resistance of the resin itself to the electrolytic solution, and used industrially for a number of models. However, this binder has the disadvantages of having poor adhesion between active materials each other and between the active materials and current collectors, requiring a large amount of binder for practical use, and as a result, decreasing the capacity and energy density of the lithium ion secondary battery. In addition, because of the use, for the binder, of NMP that is an expensive organic solvent, there have been problems with the price of a final product and with working environment conservation in the preparation of slurry or a current collector.

As a method for solving these problems, water-dispersible styrene-butadiene rubbers (SBR) combined with carboxymethyl cellulose (CMC) as a thickener have been proposed (for example, see Patent Literatures 1 to 3). This type of water-dispersible SBR has been used as a aqueous binder for an lithium ion secondary battery electrode in a wide range of application, because the SBR type dispersing element is inexpensive because of its water dispersibility, and advantageous from the standpoint of working environment conservation, and has favorable adhesion between active materials each other and between the active materials and current collectors. However, this binder has the problems of low mechanical stability, and of low swelling resistance to an electrolytic solvent. Furthermore, this binder has the problem of decreasing charge-discharge cycle characteristics in the case of a lithium ion secondary battery for use at high temperatures.

In order to prevent this decrease in charge-discharge cycle characteristics at high temperatures, Patent Literature 4 proposes a binder composed of a monomer derived from an ethylenically unsaturated carboxylic acid ester and an ethylenically unsaturated carboxylic acid. However, this binder is inferior in adhesion between active materials, and has the problem of significantly decreasing the adhesion between the active materials and current collectors. In addition, Patent Literature 5 proposes a binder obtained by mixing a binder composed of a monomer derived from an $\alpha,\beta$-unsaturated nitrile compound and a (meth)acrylic acid ester with a binder composed of a monomer derived from a conjugated diene. However, this binder composition has a problem with adhesion between active materials while the binder composition has high charge-discharge high-temperature cycle characteristics.

Among water-dispersible type binders obtained by the previously studied methods as described above, any binder for a lithium ion secondary battery electrode has not been found which has favorable adhesion between active materials each other and between the active materials and current collectors, along with charge-discharge high-temperature cycle characteristics, and currently, PVDF and SBR with CMC as a thickener have been mainly used respectively in spite of having environmental problems and in spite of having problems in terms of charge-discharge high-temperature cycle characteristics.

CITATION LIST

Patent Literature

Patent Literature 1: Japanese Patent Application Laid-Open (JP-A) No. 5-74461
Patent Literature 2: JP-A No. 6-150906
Patent Literature 3: JP-A No. 8-250123
Patent Literature 4: JP-A No. 2000-195521
Patent Literature 5: JP-A No. 2006-269386

SUMMARY OF INVENTION

Technical Problem

An object of the present invention is to provide a binder for a lithium ion secondary battery electrode, which is water-dispersible type and has favorable adhesion between active materials and between the active materials and current collectors, along with charge-discharge high-temperature cycle characteristics, a slurry using the binder, an electrode using the slurry, and a lithium ion secondary battery using the electrode.

Solution to Problem

As a result of a great deal of earnest study for the purpose of achieving a binder for a lithium ion secondary battery electrode, which is water-dispersible type and has favorable adhesion between active materials and between the active materials and current collectors, along with charge-discharge high-temperature cycle characteristics, a slurry using the binder, an electrode using the slurry, and a lithium ion secondary battery using the electrode, the inventors have found the achievement of; a binder for a lithium ion secondary battery electrode, including, as a resin component, an aqueous emulsion with a glass transition temperature of 30° C. or lower and a dried film swelling resistance rate of 300% or less to an electrolytic solution at 60° C., which is obtained by emulsion polymerization of an ethylenically unsaturated monomer containing, as essential constituents, a specific amount of styrene, an ethylenically unsaturated carboxylic acid ester, an ethylenically unsaturated carboxylic acid, and an internal cross-linking agent in the presence of a surfactant; a slurry obtained with the use of the binder for an electrode, an electrode obtained with the use of the slurry, and a lithium ion secondary battery obtained with the use of the electrode, and achieved the present invention.

More specifically, the present invention relates to a binder for a lithium ion secondary battery electrode with a glass transition temperature of 30° C. or lower, which is obtained by emulsion polymerization of an ethylenically unsaturated monomer containing, as essential constituents, 15 to 70 mass % of styrene with respect to the total mass of ethylenically unsaturated monomers, an ethylenically unsaturated carboxylic acid ester, an ethylenically unsaturated carboxylic acid and an internal cross-linking agent in the presence of a surfactant.

In the binder for a lithium ion secondary battery electrode according to the present invention, it is preferable that a dried film has a swelling resistance rate of 300% or less to an electrolytic solution at 60° C.

The ethylenically unsaturated carboxylic acid is preferably contained at 1 to 10 mass % with respect to the total mass of ethylenically unsaturated monomers.

The internal cross-linking agent is preferably contained at 0.1 to 5 mass % with respect to the total mass of ethylenically unsaturated monomers.

The present invention relates to a slurry for a lithium ion secondary battery electrode, which is obtained with the use of the binder for a lithium ion secondary battery electrode and an active material.

The present invention relates to a slurry for a lithium ion secondary battery electrode, which is obtained with the use of the binder for a lithium ion secondary battery electrode, an active material, and carboxymethyl cellulose.

The present invention relates to an electrode for a lithium ion secondary battery, which is obtained with the use of the slurry for a lithium ion secondary battery electrode.

The present invention relates to a lithium ion secondary battery obtained with the use of the electrode for the lithium ion secondary battery.

Advantageous Effects of Invention

According to the present invention, a binder for a lithium ion secondary battery electrode, which is water-dispersible type and has favorable adhesion between active materials and between the active materials and current collectors, along with charge-discharge high-temperature cycle characteristics can be provided, through the use, for a binder in the preparation of an electrode for a lithium secondary battery, of an aqueous emulsion with a glass transition temperature of 30° C. or lower and a dried film swelling resistance rate of 300% or less to an electrolytic solution at 60° C., which is obtained by emulsion polymerization of an ethylenically unsaturated monomer containing, as essential constituents, a specific amount of styrene, an ethylenically unsaturated carboxylic acid ester, an ethylenically unsaturated carboxylic acid, and an internal cross-linking agent in the presence of a surfactant.

DESCRIPTION OF EMBODIMENTS

Components constituting the present invention will be described below in detail.

The binder for a lithium ion secondary battery electrode according to the present invention is obtained by emulsion polymerization of an ethylenically unsaturated monomer containing, as essential constituents, styrene, an ethylenically unsaturated carboxylic ester, an ethylenically unsaturated carboxylic acid, and an internal cross-linking agent, in the presence of a surfactant in an aqueous medium.

The reason why the styrene for use in the present invention is regarded as an essential constituent is for developing adhesion between active materials. In particular, when a carbon material such as graphite is used as an active material, the effect can be further improved. The used amount of styrene is 15 to 70 mass %, preferably 30 to 60 mass % with respect to the total mass of ethylenically unsaturated monomers. The used amount of styrene less than 15 mass % is inferior in adhesion between active materials, thereby resulting in a significant decrease in adhesion between an active material and a current collector. On the other hand, the used amount of styrene greater than 70 mass % increases the glass transition temperature (Tg) of the binder, thereby undesirably causing an electrode obtained from the application of slurry containing an active material to be cracked.

Examples of the ethylenically unsaturated carboxylic ester for use in the present invention include an ethylenically unsaturated carboxylic ester having a polar group such as a hydroxy group and a glycidyl group, for example, and these esters are used for the purpose of improving the emulsion polymerization stability or mechanical stability of binders obtained. Specifically, the examples include (meth)acrylic acid 2-hydroxyalkyls such as (meth)acrylic acid 2-hydroxyethyl, and (meth)acrylic acid 2-hydroxypropyl; and glycidyl acrylate. Among these esters, (meth)acrylic acid 2-hydroxyethyl is preferred.

The used amount of the ethylenically unsaturated carboxylic ester having a polar group is 0.1 to 10 mass %, and preferably 0.5 to 5 mass % with respect to the total mass of ethylenically unsaturated monomers. When the used amount of the ethylenically unsaturated carboxylic ester having a polar group is less than 0.1 mass %, there is a tendency to decrease the emulsion polymerization stability or mechanical stability, and decrease the swelling resistance rate of a dried film to an electrolytic solution, whereas there is a tendency to decrease the adhesion between active materials and between the active materials and current collectors when the amount is greater than 10 mass %.

The other ethylenically unsaturated carboxylic esters include, for example, (meth)acrylic acid esters such as a methyl (meth)acrylate, an ethyl (meth)acrylate, n-propyl (meth)acrylate, isopropyl(meth)acrylate, n-butyl (meth)acrylate, iso-butyl (meth)acrylate, tert-butyl (meth)acrylate, n-hexyl(meth)acrylate, 2-ethylhexyl(meth)acrylate, lauryl (meth)acrylate, stearyl(meth)acrylate, cyclohexyl(meth) acrylate, isononyl(meth)acrylate, isobornyl(meth)acrylate, and benzyl(meth)acrylate; and vinyl acetate and vinyl propionate. Among these esters, n-butyl (meth)acrylate, 2-ethylhexyl(meth)acrylate, lauryl(meth)acrylate, and isobornyl (meth)acrylate are preferred in terms of ease of emulsion polymerization and durability.

The used amount of the other ethylenically unsaturated carboxylic esters is 25 to 85 mass %, and preferably 30 to 80 mass % with respect to the total mass of ethylenically unsaturated monomers. When the used amount of the ethylenically unsaturated carboxylic esters is less than 25 mass %, there is a tendency to decrease the flexibility and heat resistance of an electrode obtained, whereas there is a tendency to decrease the adhesion between active materials and between the active materials and current collectors when the amount is greater than 85 mass %.

In addition, to such an extent that no damage is caused to the features of the present invention, compounds can be used which have at least one polymerizable ethylenically unsaturated group and have a polar group such as an amide group and a nitrile group. The compounds include, for example, (meth) acrylamide, N-methylol(meth)acrylamide, and (meth)acrylonitrile.

Examples of the ethylenically unsaturated carboxylic acid for use in the present invention include unsaturated monocarboxylic acids such as an acrylic acid, a methacrylic acid, and a crotonic acid, and unsaturated dicarboxylic acids such as a maleic acid, a fumaric acid, and an itaconic acid or half esters of these unsaturated dicarboxylic acids, and among these acids, an acrylic acid and an itaconic acid are preferred. These ethylenically unsaturated carboxylic acids may be used singularly by themselves, or two or more of the ethylenically unsaturated carboxylic acids may be used in combination.

The used amount of the ethylenically unsaturated carboxylic acid is 1 to 10 mass %, and preferably 1 to 5 mass % with respect to the total mass of ethylenically unsaturated monomers. When the used amount of the ethylenically unsaturated carboxylic acid is less than 1 mass %, there is a tendency to decrease the emulsion polymerization stability or mechanical stability, or to decrease the heat resistance of an electrode obtained, whereas there is a tendency to decrease the adhesion between active materials and between the active materials and current collectors when the amount is greater than 10 mass %.

Furthermore, the internal cross-linking agent is used in order to further improve the swelling resistance rate of an obtained dried film of a binder for a lithium ion secondary battery electrode to an electrolytic solution solvent. The internal cross-linking agent may be any agent which has at least one ethylenically unsaturated bond and has a reactive group reactive with other functional group, or any agent which has two or more ethylenically unsaturated bonds. Examples of the internal cross-linking agent include crosslinkable multifunctional monomers having two or more unsaturated groups such as divinylbenzene, ethylene glycol di(meth)acrylate, trimethylol propane tri(meth)acrylate, and triallyl cyanurate; and silane coupling agents such as vinyl trimethoxy silane, vinyl triethoxy silane, γ-methacryloyloxypropyl trimethoxy silane, and γ-methacryloyloxypropyl triethoxy silane, and among these internal cross-linking agents, divinylbenzene is preferred. These internal cross-linking agents may be used singularly by themselves, or two or more of the internal cross-linking agents may be used in combination.

The used amount of the internal cross-linking agent is 0.1 to 5 mass %, and preferably 0.1 to 3 mass % with respect to the total mass of ethylenically unsaturated monomers. When the used amount of the ethylenically unsaturated carboxylic acid is less than 0.1 mass %, there is a tendency to decrease the swelling resistance rate of a dried film to an electrolytic solution, whereas there is a tendency to decrease the emulsion polymerization stability, and to decrease the adhesion between an active material and a current collector when the amount is greater than 5 mass %.

In addition, mercaptan, thioglycolic acid and esters thereof, β-mercaptopropionic acid and esters thereof may be used in order to adjust the molecular weight.

The binder for a lithium secondary battery according to the present invention needs to have a Tg of 30° C. or lower. The Tg higher than 30° C. undesirably causes an electrode obtained from the application of slurry containing an active material to be cracked.

Furthermore, for the binder for a lithium secondary battery according to the present invention, the dried film has a swelling resistance rate of 300% or less, preferably 5% to 200% to a propylene carbonate or diethyl carbonate based electrolytic solution solvent at 60° C. When the swelling resistance rate of the dried film is greater than 300% to the electrolytic solution at 60° C., charge-discharge high-temperature cycle characteristics will be undesirably decreased at high temperatures.

As the surfactant for use in the emulsion polymerization according to the present invention, a common anionic surfactant or non-ionic surfactant is used. Examples of the anionic surfactant include, for example, alkylbenzene sulfonates, alkyl sulfate esters, polyoxyethylene alkyl ether sulfate esters, and fatty acid salts, and examples of the non-ionic surfactant include polyoxyethylene alkyl ethers, polyoxyethylene alkyl phenyl ethers, polyoxyethylene polycyclic phenyl ethers, polyoxyalkylene alkyl ether, sorbitan fatty acid ester, and polyoxyethylene sorbitan fatty acid ester. These surfactants may be used singularly by themselves, or two or more of the surfactants may be used in combination.

While the surfactant is not particularly limited as long as the surfactant is reactive, more preferably surfactants include surfactants represented by the following formula (1):

[Chemical formula 1]

(1)

(in the formula, R is an alkyl group, and n is an integer of 10 to 40); surfactants represented by the following formula (2):

[Chemical formula 2]

(2)

(in the formula, n is an integer of 10 to 12, and m is an integer of 10 to 40); surfactants represented by the following formula (3):

[Chemical formula 3]

(3)

(in the formula, R is an alkyl group, and M is $NH_4$ or Na); and surfactants represented by the following formula (4):

[Chemical formula 4]

(4)

(in the formula, R is an alkyl group, and M is Na).

The used amount of the surfactant is preferably 0.3 to 3 mass % with respect to the total mass of ethylenically unsaturated monomers. In the case of the used amount of the surfactant is less than 0.3 mass %, the emulsion polymerization is difficult, or if the emulsion polymerization is possible, the polymerization stability will be problematic, and the particle size of the obtained aqueous emulsion will be undesirably increased to cause the sedimentation of the resin emulsion. Alternatively, when the used amount of the surfactant is greater than 3 mass %, the adhesion between an active material and a current collector will be undesirably decreased significantly.

The radical polymerization initiator for use in the emulsion polymerization may be any known radical polymerization initiator, and examples thereof include, for example, ammonium persulfate, potassium persulfate, hydrogen peroxide, and t-butyl hydroperoxide. In addition, if necessary, these polymerization initiators may be used with a reducing agent such as sodium bisulfate, Rongalite, and ascorbic acid, for redox polymerization.

As an emulsion polymerization method for the aqueous emulsion according to the present invention, a polymerization method by introduction at a time, a polymerization method while continuous supply of respective constituents, or the like is applied. The polymerization is typically carried out while stirring at a temperature of 30 to 90° C. It is to be noted that the polymerization stability, mechanical stability, and chemical stability during the emulsion polymerization can be improved by adjusting the pH of the copolymerized ethylenically unsaturated carboxylic acid obtained in the present invention with the addition of a basic substance during the polymerization or after the completion of the polymerization.

As the basic substance for use in this case, ammonia, triethylamine, ethanolamine, caustic soda, etc., can be used. These substances may be used singularly by themselves, or two or more of the basic substances may be used in combination.

Next, the slurry for a lithium ion secondary battery electrode according to the present invention will be described in detail. The slurry for a lithium ion secondary battery electrode according to the present invention has the binder for a lithium ion secondary battery electrode and an active material which are dispersed or dissolved in water, or a mixture of water with a highly hydrophilic solvent. The slurry preparation includes, for example, a method in which the binder for a lithium ion secondary battery electrode is dispersed, dissolved, or kneaded in a solvent, and further dispersed, dissolved, or kneaded with the addition of other additive and an active material.

The active material may be any carbonaceous material which is able to be doped/undoped with lithium, etc., and examples thereof include conductive polymers such as polyacetylene and polypyrrole; or cokes such as coke, petroleum coke, pitch coke, and coal coke; carbon black such as polymer coal, carbon fibers, and acetylene black; pyrolytic carbons; glassy carbon; sintered bodies of organic polymer materials, which are obtained by sintering of organic polymer materials at 500° C. or more in vacuum or in an inert gas; and carbon fibers. Among these carbonaceous materials, pyrolytic carbons, cokes, carbon black, glassy carbon, sintered bodies of organic polymer materials, and carbon fibers are preferred because of their high energy density per volume.

The electrode according to the present invention is produced by applying the slurry for a lithium ion secondary battery electrode onto a current collector, and drying the slurry. For the method of applying the slurry according to the present invention, common methods can be used, which include, for example, a reverse roll method, a direct roll method, a doctor blade method, a knife method, an extrusion method, a curtain method, a gravure method, a bar method, a dip method, a squeeze method. Among these methods, a doctor blade method, a knife method, and an extrusion method are preferred in that the selection of the application method depending on the properties such as viscosity and drying characteristics for the slurry for a lithium ion secondary battery electrode makes it possible to achieve a favorable surface state for the applied layer.

The application of the slurry for a lithium ion secondary battery electrode onto the current collector may be carried out onto one or both sides of the current collector, and in the case of applying the slurry onto the both sides of the current collector, the application may be sequentially carried out by one side, or simultaneously onto the both sides. In addition, the application may be carried out continuously or intermittently onto the surface of the current collector. The thickness, length, and width of the applied layer can be determined appropriately depending on the size of the battery.

For the method of drying the slurry according to the present invention, common methods can be used. In particular, hot air, vacuum, infrared rays, far-infrared rays, electron beams, and cool wind can be preferably used by themselves, or in combination. The drying temperature preferably falls within the range of 80 to 350° C., and in particular, preferably the range of 100 to 250° C.

The current collector for use in the production of the electrode according to the present invention is not particularly limited, as long as the current collector is metallic such as iron, copper, aluminum, nickel, and stainless steel. In addition, while the shape of the current collector is not particularly limited, it is typically preferable to use a sheet-like current collector of 0.001 to 0.5 mm in thickness. The electrode according to the present invention can be pressed, if necessary. While common methods can be used as the pressing method, a mold press method and a calender press method are particularly preferred. The pressing pressure is not particularly limited, but preferably 0.2 to 3 $t/cm^2$.

The battery according to the present invention is produced in accordance with a known method with the use of the positive electrode and/or negative electrode according to the present invention, an electrolytic solution, and if necessary, a component such as a separator. For the electrode, a laminated body and a wound body can be used. As the exterior body, a metallic exterior body and an aluminum laminate exterior body can be used appropriately. The shape of the battery may be any shape such as a coin shape, a button shape, a sheet shape, a cylindrical shape, a square shape, and a flat shape. As the electrolyte in the electrolytic solution of the battery, any of known lithium salts can be used, and the electrolyte may be selected depending on the type of the active material. The lithium salts include $LiClO_4$, $LiBF_6$, $LiPF_6$, $LiCF_3SO_3$, $LiCF_3SO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and short-chain fatty acid lithium carboxylate.

The solvent for dissolving the electrolyte is not particularly limited as long as the solvent is commonly used as a liquid for dissolving an electrolyte, and examples of the solvent include carbonates such as ethylene carbonate (EC), propylene carbonate (PC), butylene carbonate (BC), dimethyl carbonate (DMC), diethyl carbonate (DEC), methylethyl carbonate (MEC), and vinylene carbonate (VC); lactones such as γ-butyrolactone, and γ-valerolactone; ethers such as trimethoxymethane, 1,2-dimethoxyethane, diethylether, 2-ethoxyethane, tetrahydrofuran, and 2-methyltetrahydrofuran; sulfoxides such as dimethylsulfoxide; oxolans such as 1,3-dioxolan and 4-methyl-1,3-dioxolan; nitrogenous compounds such as acetonitrile, nitromethane, formamide, and dimethylformamide; organic acid esters such as methyl formate, methyl acetate, ethyl acetate, butyl acetate, methyl propionate, and ethyl propionate; phosphate triester and diglymes; triglymes; sulfolanes such as sulfolane and methylsulfolane; oxazolidinones such as 3-methyl-2-oxazolidinone; and sultones such as 1,3-propanesultone, 1,4-butanesultone, and naphthasultone. These solvents may be used singularly by themselves, or two or more of the basic substances may be used in combination.

EXAMPLES

While, the present invention will be described below in further detail with reference to Examples and Comparative Examples, the present invention is not to be considered limited by these Examples. It is to be noted that the term "parts" and "%" in the Examples and Comparative Examples respectively represent parts by mass and mass %, unless otherwise noted. For binders for lithium ion secondary battery electrodes and batteries obtained with the use of these binders for electrodes, which were obtained in the Examples and Comparative Examples, property and performance evaluation tests were carried out by the following methods.

(Non-Volatile Content)

On an aluminum plate of 5 cm in diameter, approximately 1 g of the resin was weighed, and dried at 105° C. for 1 hour, and the residue was weighed to calculate the non-volatile content.

(Viscosity)

A Brookfield rotational viscometer was used to measure the viscosity at a liquid temperature of 23° C. and a revolution speed of 10 rpm with rotor No. 2 or No. 3.

(Test on Swelling Resistance Rate of Dried Film)

The obtained polymer emulsion was dried at 23° C. and 50% RH for 7 days, and then subjected to vacuum drying at 60° C. for 12 h to create a dried film. The dried film was immersed in an electrolyte solvent of propylene carbonate/diethyl carbonate (1:1 in terms of mass ratio) at 60° C. for 12 days to measure the swelling resistance rate.

$$\text{Swelling Resistance Rate}(\%) = (\text{Mass after Immersion} - \text{Mass after Immersion and re-drying})/\text{Mass after Immersion and re-drying} \times 100 \quad [\text{Mathematical formula 1}]$$

(Peeling Strength Test of Current Collector)

The following obtained slurry for an electrode was applied at Wet 150 μm/m² onto copper foil as a current collector, dried by heating at 60° C. for 30 minutes, subsequently subjected to vacuum drying at 120° C. for 1 h, and left out at 23° C. and 50% RH for 24 hours to provide a test piece. For a peeling strength test, a coated surface of the test piece and a SUS plate are bonded to each other with double-faced tape, and subjected to 180° peeling (peeling width: 25 mm, peeling speed: 100 mm/min).

(Charge-Discharge High-Temperature Cycle Characteristics)

For a cycle test on the battery, CC-CV charge (maximum voltage: 4.2 V; current: 1 C; CV time: 1.5 hours) and CC discharge (minimum voltage: 3.0V; current: 1 C) were adopted each of which was carried out at 60° C. The capacity retention rate was defined as the ratio of the discharge capacity in $500^{th}$ cycle to the discharge capacity the first cycle.

(Synthesis of Aqueous Emulsion A)

In a separable flask with a cooling tube, a thermometer, a stirrer, and a dropping funnel, 160 parts of ion-exchange water and 2 parts of anionic surfactant (manufactured by Sanyo Chemical Industries, Ltd., ELEMINOL JS-20 (a compound which has the structure formula of the formula (4)), 40% product) were put, and heated to 75° C. A monomer emulsified product was added dropwise over 3 hours, which was preliminarily composed of 10 parts of ELEMINOL JS-20, 2 parts of HITENOL 08E (polyoxyethylene alkyl ether sulfate ester, manufactured by Dai-ichi Kogyo Seiyaku Co., Ltd.), 250 parts of styrene, 220 parts of acrylic acid 2-ethylhexyl, 10 parts of methacrylic acid 2-hydroxyethyl, 1.5 parts of divinylbenzene, 15 parts of acrylic acid (80% product), and 395 parts of ion-exchange water. At the same time, 2 parts of potassium persulfate as a polymerization initiator dissolved in 50 parts of ion-exchange water was added dropwise for polymerization at 80° C. over 3 hours. After the completion of the drop, through aging for 2 hours and then cooling, 4.5 parts of ammonia water was added to obtain an aqueous emulsion A. The obtained aqueous emulsion A had a non-volatile content of 45.5%, a viscosity of 3000 mPa·s, and pH of 6.5.

(Synthesis of Aqueous Emulsion B)

Except that a change was made to an anionic surfactant (ADEKA REASOAP SR-10 manufactured by ADEKA Corporation (a compound composed of the structure formula of the formula (1))) as a surfactant in place of ELEMINOL JS-20, the same operation was carried out as in the synthesis of the aqueous emulsion A. The obtained aqueous emulsion B had a non-volatile content of 45.4%, a viscosity of 3200 mPa·s, and pH of 6.6.

(Synthesis of Aqueous Emulsion C)

Except that the 250 parts of styrene and the 220 parts of acrylic acid 2-ethylhexyl were changed to 100 parts of styrene and 370 parts of acrylic acid 2-ethylhexyl, the same operation was carried out as in the synthesis of the aqueous emulsion A. The obtained aqueous emulsion C had a non-volatile content of 44.8%, a viscosity of 2800 mPa·s, and pH of 6.4.

(Synthesis of Aqueous Emulsion D)

Except that the 250 parts of styrene and the 220 parts of acrylic acid 2-ethylhexyl were changed to 320 parts of styrene and 150 parts of acrylic acid 2-ethylhexyl, the same operation was carried out as in the synthesis of the aqueous emulsion A.

The obtained aqueous emulsion D had a non-volatile content of 44.9%, a viscosity of 2900 mPa·s, and pH of 6.5.

(Synthesis of Aqueous Emulsion E)

Except that the 15 parts of acrylic acid (80% product) was changed to 25 parts of acrylic acid (80% product), the same operation was carried out as in the synthesis of the aqueous emulsion A. The obtained aqueous emulsion E had a non-volatile content of 45.3%, a viscosity of 6500 mPa·s, and pH of 6.2.

(Synthesis of Aqueous Emulsion F)

Except that the 15 parts of acrylic acid (80% product) was changed to 12 parts of itaconic acid, the same operation was carried out as in the synthesis of the aqueous emulsion A. The obtained aqueous emulsion F had a non-volatile content of 45.0%, a viscosity of 1050 mPa·s, and pH of 6.2.

(Synthesis of Aqueous Emulsion G)

Except that the 250 parts of styrene and the 220 parts of acrylic acid 2-ethylhexyl were changed to 250 parts of styrene and 220 parts of butyl acrylate, the same operation was carried out as in the synthesis of the aqueous emulsion A. The obtained aqueous emulsion G had a non-volatile content of 45.5%, a viscosity of 4200 mPa·s, and pH of 6.4.

(Synthesis of Aqueous Emulsion H)

Except that the 250 parts of styrene and the 220 parts of acrylic acid 2-ethylhexyl were changed to 60 parts of styrene and 410 parts of acrylic acid 2-ethylhexyl, the same operation was carried out as in the synthesis of the aqueous emulsion A. The obtained aqueous emulsion H had a non-volatile content of 44.5%, a viscosity of 2500 mPa·s, and pH of 6.4.

(Synthesis of Aqueous Emulsion I)

Except that the 250 parts of styrene and the 220 parts of acrylic acid 2-ethylhexyl were changed to 370 parts of styrene and 100 parts of acrylic acid 2-ethylhexyl, the same operation was carried out as in the synthesis of the aqueous emulsion A. The obtained aqueous emulsion I had a non-volatile content of 44.8%, a viscosity of 3500 mPa·s, and pH of 6.5.

(Synthesis of Aqueous Emulsion J)

Except that the 15 parts of acrylic acid was changed to no acrylic acid used, the same operation was carried out as in the synthesis of the aqueous emulsion A. The obtained aqueous emulsion J had a non-volatile content of 45.1%, a viscosity of 850 mPa·s, and pH of 7.4.

(Synthesis of Aqueous Emulsion K)

Except that the 1.5 parts of divinylbenzene was changed to no divinylbenzene used, the same operation was carried out as in the synthesis of the aqueous emulsion A. The obtained aqueous emulsion K had a non-volatile content of 45.0%, a viscosity of 3000 mPa·s, and pH of 6.5.

While Examples for a lithium ion secondary battery prepared with the use of the binder according to the present invention will be described below in detail with reference to the drawings, the present invention is not to be considered limited to these Examples.

Example 1

Figure 1:
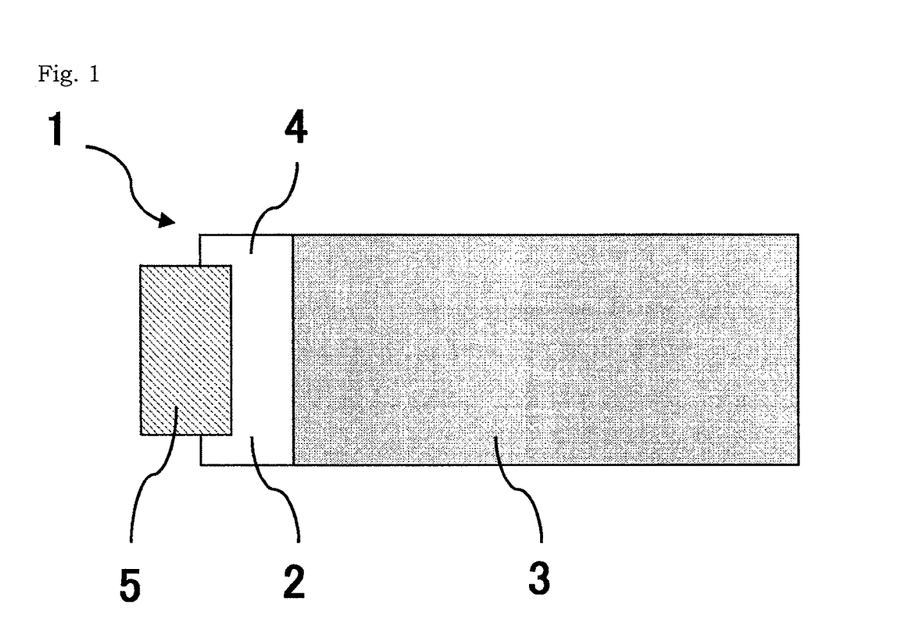
FIG. 1 is a diagram illustrating the configuration of a positive electrode of a lithium ion battery according to an embodiment of the present invention.

First, the preparation of the positive electrode will be described with reference to FIG. 1. N-methylpyrrolidone was added to and mixed with a mixture of 85 mass % of $LiMn_2O_4$, 7 mass % of acetylene black as a conducting aid, and 8 mass % of polyvinylidene fluoride as a binder to prepare positive electrode slurry. This slurry was applied by a doctor blade method onto both sides of Al foil 2 of 20 μm in thickness to serve as a current collector so that the thickness was 160 μm after roll press processing, dried at 120° C. for 5 minutes, and through a press step, a positive electrode active material applied section 3 was formed. Further, each surface at the both ends was provided with a positive electrode active material non-applied section 4, and one of the positive electrode active material non-applied sections 4 was provided with a positive electrode conducting tab 5, thereby providing a positive electrode 1.

Figure 2:
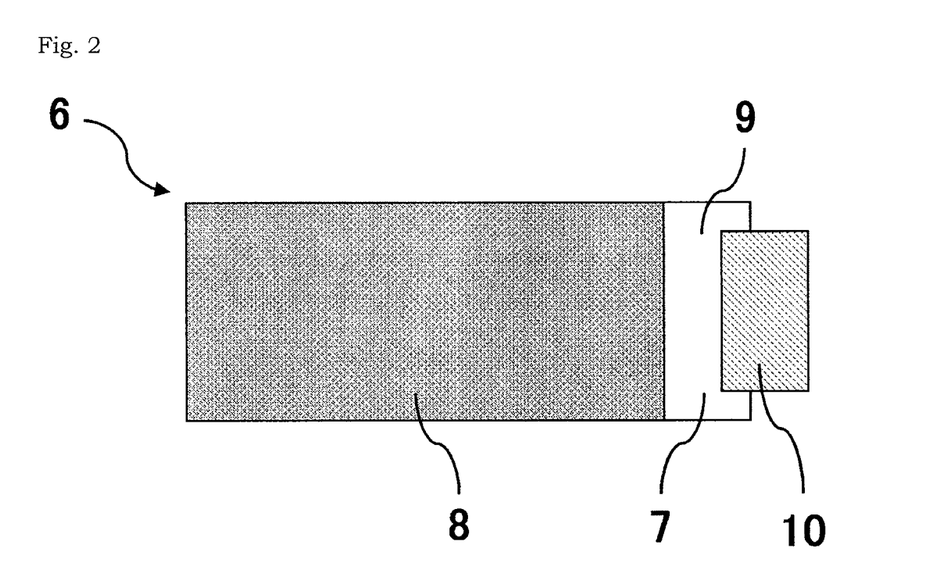
FIG. 2 is a diagram illustrating the configuration of a negative electrode of a lithium ion battery according to an embodiment of the present invention.

The preparation of the negative electrode will be described with reference to FIG. 2. Mixed were 90 mass % of graphite, 1 mass % of acetylene black as a conducting aid, 2 mass % of the aqueous emulsion A as a binder, and 1 mass % of a CMC solution of carboxymethyl cellulose (hereinafter, referred to as CMC) dissolved in water as a thickener, and further mixed with the addition of water to prepare negative electrode slurry. This slurry was applied onto both sides of Cu foil 7 of 10 μm in thickness to serve as a current collector so that the thickness was 120 μm after roll press processing, dried at 100° C. for 5 minutes, and through a press step, a negative electrode active material applied section 8 was formed. Further, one end surface of the both ends was provided with a negative electrode active material non-applied section 9, to which a negative electrode conducting tab 10 was attached, thereby providing a negative electrode 6.

Figure 3:
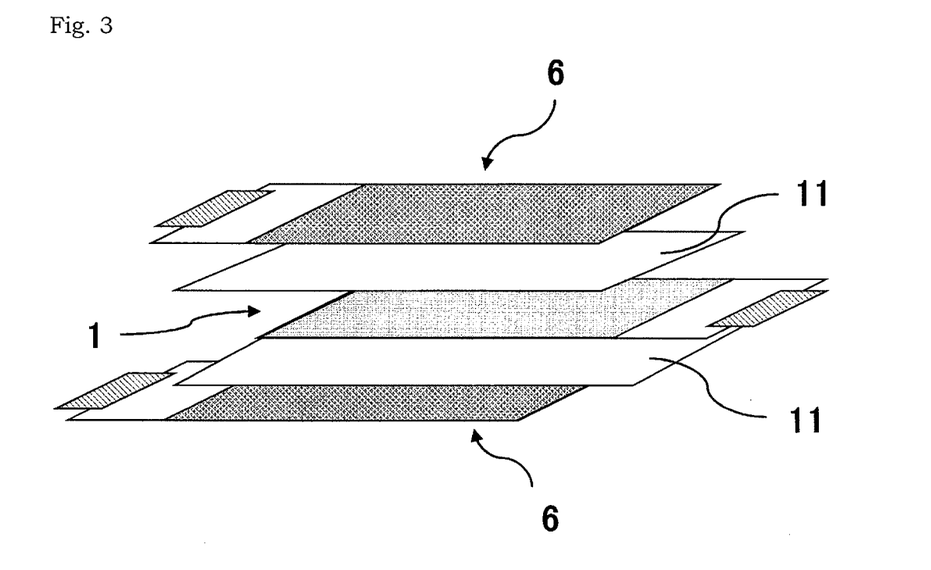
FIG. 3 is a cross-sectional view illustrating the configuration of stacked battery elements of a lithium ion battery according to an embodiment of the present invention.

The preparation of the battery element will be described with reference to FIG. 3. On the negative electrode 6 (FIG. 2), a separator 11 was cut and stacked which was composed of a microporous membrane of a hydrophilically augmented polyprolylene microporous membrane of 25 μm in film thickness with a porosity of 55%. Further, the positive electrode 1 (FIG. 1), the cut separator 11, the negative electrode 6 (FIG. 2) was stacked in this order to form an element (FIG. 3).

The preparation of the battery precursor will be described with reference to FIG. 4. The element (FIG. 3) is housed in an embossed laminate exterior body 12, and with the positive electrode conducting tab 5 and negative electrode conducting tab 10 extracted, the laminate exterior body 12 was subjected to thermal fusion bonding with a liquid injection section 13 left, thereby preparing a battery pack.

Figure 4:
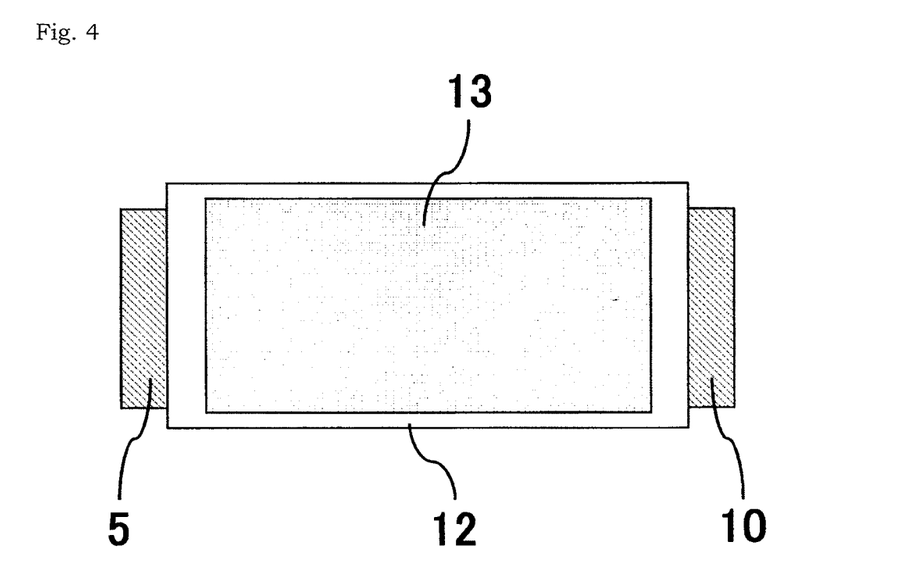
FIG. 4 is a diagram illustrating the configuration of a battery precursor for a lithium ion battery according to an embodiment of the present invention.

From the liquid injection section 13 of the battery precursor in FIG. 4, a 1.0 mol/L (liter) electrolytic solution of $LiPF_6$ with ethylene carbonate (EC)/diethyl carbonate (DEC)=30/70 (volume ratio) was injected for carrying out vacuum impregnation, and the liquid injection section 13 was subjected to thermal fusion bonding to obtain a battery.

Table 1 shows the evaluation results of the binder, slurry, and lithium ion secondary battery prepared with the use of the binder and the slurry.

Examples 2 to 7

Except for the use of the aqueous emulsions B to G, the same operation as in Example 1 was carried out to obtain slurry for a lithium ion secondary battery electrode. The evaluation results are shown in Table 1.

Comparative Example 1

Except that the aqueous emulsion H was used in place of the aqueous emulsion A, the same operation as in Example 1 was carried out to obtain slurry for a lithium ion secondary battery electrode. The evaluation results are shown in Table 1.

Comparative Examples 2 to 4

Except that the aqueous emulsions I to K were used in place of the aqueous emulsion A, the same operation as in Comparative Example 1 was carried out to obtain slurry for a lithium ion secondary battery electrode. The evaluation results are shown in Table 1.

TABLE 1

| | Properties | | | | Calculated | Swelling Resistance | Peeling Strength of | Charge Discharge High Temperature |
|---|---|---|---|---|---|---|---|---|
| | Aqueous Emulsion | Non-Volatile Content (%) | Viscosity (mPa·s) | pH | Tg (°C.) | Rate of Dried Film (%) | Current Collector (mN/mm) | Cycle Characteristics |
| Example 1 | A | 45.5 | 3000 | 6.5 | −2 | 103 | 60 | 72 |
| Example 2 | B | 45.4 | 3200 | 6.6 | −2 | 104 | 58 | 71 |
| Example 3 | C | 44.8 | 2800 | 6.4 | −45 | 107 | 65 | 73 |
| Example 4 | D | 44.9 | 2900 | 6.5 | 24 | 110 | 50 | 67 |
| Example 5 | E | 45.3 | 6500 | 6.2 | −1 | 113 | 53 | 65 |
| Example 6 | F | 45.0 | 1050 | 6.2 | −4 | 114 | 55 | 64 |
| Example 7 | G | 45.5 | 4200 | 6.4 | 12 | 118 | 52 | 61 |
| Comparative Example 1 | H | 44.5 | 2500 | 6.4 | −54 | 130 | 35 | 30 |
| Comparative Example 2 | I | 44.8 | 3500 | 6.5 | 45 | 350 | 12 | 42 |
| Comparative Example 3 | J | 45.1 | 850 | 7.4 | −4 | 150 | 10 | 44 |
| Comparative Example 4 | K | 45.0 | 3000 | 6.5 | −2 | 330 | 21 | 39 |

From a comparison between Examples 1 to 7 and Comparative Examples 1 to 4, it is determined that the slurry for a lithium ion secondary battery electrode according to the present invention is excellent in the swelling resistance rate of the dried film, and that the use of this slurry achieves a lithium ion secondary battery which is excellent in the peeling strength of the current collector and the charge-discharge high-temperature cycle characteristics.

Reference Signs List

1 Positive electrode
2 Al foil
3 Positive electrode active material applied section
4 Positive electrode active material non-applied section
5 Positive electrode conducting tab
6 Negative electrode
7 Cu foil
8 Negative electrode active material applied section
9 Negative electrode active material non-applied section
10 Negative electrode conducting tab
11 Separator
12 Laminate exterior body
13 Liquid injection section

The invention claimed is:

1. A binder for a lithium ion secondary battery electrode, being obtained by emulsion polymerization of ethylenically unsaturated monomers containing, as essential constituents, 15 to 70 mass % of styrene with respect to the total mass of ethylenically unsaturated monomers, 0.1 to 5 mass % of an ethylenically unsaturated carboxylic acid ester having a polar group with respect to the total mass of ethylenically unsaturated monomers, an ethylenically unsaturated carboxylic acid, another ethylenically unsaturated carboxylic acid ester, and an internal cross-linking agent in the presence of a surfactant, and
having a glass transition temperature of 30° C. or lower.

2. The binder for a lithium ion secondary battery electrode according to claim 1,
wherein a dried film has a swelling resistance rate of 300% or less to an electrolytic solution at 60° C.

3. The binder for a lithium ion secondary battery electrode according to claim 1,
wherein the ethylenically unsaturated carboxylic acid is contained at 1 to 10 mass % with respect to the total mass of ethylenically unsaturated monomers.

4. The binder for a lithium ion secondary battery electrode according to claim 1,
wherein the internal cross-linking agent is contained at 0.1 to 5 mass % with respect to the total mass of ethylenically unsaturated monomers.

5. A slurry for a lithium ion secondary battery electrode, being obtained by using the binder for a lithium ion secondary battery electrode according to claim 1 and an active material.

6. An electrode for a lithium ion secondary battery, being obtained by using the slurry for a lithium ion secondary battery electrode according to claim 5.

7. A lithium ion secondary battery, being obtained by using the electrode for a lithium ion secondary battery according to claim 6.

8. A slurry for a lithium ion secondary battery electrode, being obtained by using the binder for a lithium ion secondary battery electrode according to claim 1, an active material, and carboxymethyl cellulose.

* * * * *